US011415028B2

(12) United States Patent
Hori et al.

(10) Patent No.: US 11,415,028 B2
(45) Date of Patent: Aug. 16, 2022

(54) HYBRID VEHICLE

(71) Applicant: TOYOTA JIDOSHA KABUSHIKI KAISHA, Toyota (JP)

(72) Inventors: Tetsuo Hori, Toyota (JP); Shinichi Baba, Toyota (JP); Munehiro Katsumata, Toyota (JP); Toru Shibamoto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 276 days.

(21) Appl. No.: 16/872,770

(22) Filed: May 12, 2020

(65) Prior Publication Data

US 2020/0392877 A1 Dec. 17, 2020

(30) Foreign Application Priority Data

Jun. 11, 2019 (JP) .............................. JP2019-109120

(51) Int. Cl.

| | | |
|---|---|---|
| *B60W 10/30* | (2006.01) | |
| *F01M 1/02* | (2006.01) | |
| *B60K 6/24* | (2007.10) | |
| *B60K 6/26* | (2007.10) | |
| *B60K 6/365* | (2007.10) | |

(Continued)

(52) U.S. Cl.

CPC ................. *F01M 1/02* (2013.01); *B60K 6/24* (2013.01); *B60K 6/26* (2013.01); *B60K 6/365* (2013.01); *B60W 10/04* (2013.01); *B60W 10/08* (2013.01); *B60W 10/30* (2013.01); *B60W 20/00* (2013.01); *F01M 1/16* (2013.01); *F01M 7/00* (2013.01); *F01P 3/12* (2013.01); *F01P 5/12* (2013.01); *B60Y 2200/92* (2013.01); *F01M 2001/0253* (2013.01); *F01P 2003/006* (2013.01); *F01P 2005/105* (2013.01)

(58) Field of Classification Search

CPC . B60W 10/08; F01M 1/02; F01M 2001/0253; F01P 2003/006; F01P 2005/105; F16H 57/0439; Y02T 10/62; B60K 6/445; B60K 6/26

See application file for complete search history.

(56) References Cited

U.S. PATENT DOCUMENTS

| | | | |
|---|---|---|---|
| 2015/0025739 A1* | 1/2015 | Wakairo | ............... F16H 61/0025 |
| | | | 701/36 |
| 2017/0219085 A1 | 8/2017 | Kiyokami et al. | |

(Continued)

FOREIGN PATENT DOCUMENTS

| | | | |
|---|---|---|---|
| JP | 5292200 B2 | * | 9/2013 |
| JP | 2017-137991 A | | 8/2017 |

*Primary Examiner* — George C Jin
*Assistant Examiner* — Teuta B Holbrook
(74) *Attorney, Agent, or Firm* — Hunton Andrews Kurth LLP

(57) ABSTRACT

A hybrid vehicle including an engine, a drive motor, a first oil pump, and a second oil pump is configured to, during forward travel, supply components to be cooled or lubricated with oil discharged from a discharge port of the first oil pump and a discharge port of the second oil pump via an oil passage, while the hybrid vehicle is configured to, during reverse travel, compensate for a driving force by supplying oil discharged from the discharge port of the second oil pump to the discharge port of the first oil pump via the oil passage to cause the first oil pump to operate as a hydraulic motor.

7 Claims, 8 Drawing Sheets

(51) Int. Cl.
*B60W 10/04* (2006.01)
*B60W 10/08* (2006.01)
*B60W 20/00* (2016.01)
*F01M 1/16* (2006.01)
*F01M 7/00* (2006.01)
*F01P 3/12* (2006.01)
*F01P 5/12* (2006.01)
*F01P 3/00* (2006.01)
*F01P 5/10* (2006.01)

(56) References Cited

U.S. PATENT DOCUMENTS

2018/0045090 A1* 2/2018 Kiyokami ............ F16H 57/0476
2018/0045295 A1* 2/2018 Kiyokami .............. B60K 6/445

* cited by examiner

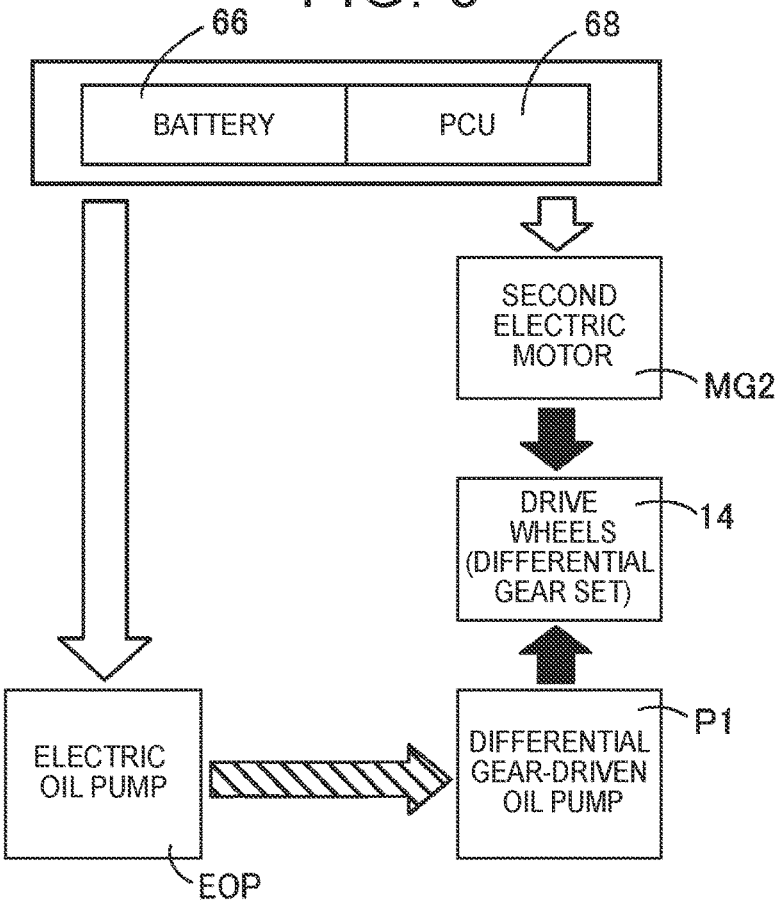

| No | DESTINATION TO BE SUPPLIED WITH OIL | | | |
|---|---|---|---|---|
| | P1 | GEAR CHAMBER GEARS AND BEARINGS | MG (MG1, MG2) | PLANETARY GEAR TRAIN GEARS AND BEARINGS |
| MODE 1 | SUPPLIED | NOT SUPPLIED | NOT SUPPLIED | NOT SUPPLIED |
| MODE 2 | SUPPLIED | SUPPLIED | NOT SUPPLIED | NOT SUPPLIED |
| MODE 3 | SUPPLIED | NOT SUPPLIED | SUPPLIED | NOT SUPPLIED |
| MODE 4 | SUPPLIED | NOT SUPPLIED | NOT SUPPLIED | SUPPLIED |
| MODE 5 | SUPPLIED | SUPPLIED | SUPPLIED | NOT SUPPLIED |
| MODE 6 | SUPPLIED | NOT SUPPLIED | SUPPLIED | SUPPLIED |
| MODE 7 | SUPPLIED | SUPPLIED | NOT SUPPLIED | SUPPLIED |
| MODE 8 | SUPPLIED | SUPPLIED | SUPPLIED | SUPPLIED |

HYBRID VEHICLE

CROSS-REFERENCE TO RELATED APPLICATION

This application claims priority to Japanese Patent Application No. 2019-109120 filed on Jun. 11, 2019, incorporated herein by reference in its entirety.

BACKGROUND

1. Technical Field

The disclosure relates to provision of a driving force during reverse travel in a hybrid vehicle that uses an engine and a motor as driving force sources.

2. Description of Related Art

A hybrid vehicle that includes an engine and a motor as driving force sources and that transmits a driving force from the driving force sources to drive wheels via an output part is known. This is, for example, the hybrid vehicle described in Japanese Unexamined Patent Application Publication No. 2017-137991 (JP 2017-137991 A). The hybrid vehicle suggested in JP 2017-137991 A includes a first oil pump and a second oil pump. The first oil pump is mechanically driven with the rotation of an output part. The second oil pump is driven by a rotational driving source different from the output part. During forward travel, oil discharged from the first oil pump and the second oil pump is supplied to components to be cooled or lubricated with oil.

SUMMARY

In the hybrid vehicle described in JP 2017-137991 A, the engine and the motor are used as the driving force sources during forward travel, and only the motor is used as the driving force source during reverse travel. Therefore, since the driving force of the engine is not used during reverse travel, shortage of driving force can occur during reverse travel.

The disclosure provides a hybrid vehicle that uses an engine and a motor as driving force sources and that is able to suppress the shortage of driving force during reverse travel.

An aspect of the disclosure relates to a hybrid vehicle including an engine, a drive motor, a first oil pump, and a second oil pump. The engine is configured as a driving force source. The drive motor is configured as a driving force source. The first oil pump is configured to be mechanically driven by a driving force that is transmitted via an output part from at least one of the engine or the drive motor. The second oil pump is configured to be driven by a driving force from a rotational driving source, and the driving force is different from a driving force transmitted to the output part. During forward travel of the hybrid vehicle, the hybrid vehicle travels by using at least one of the engine or the drive motor, while, during reverse travel of the hybrid vehicle, the hybrid vehicle uses the drive motor and travels by transmitting a driving force from the drive motor to a drive wheel via the output part. During forward travel of the hybrid vehicle, the hybrid vehicle is configured to supply components to be cooled or lubricated with oil discharged from a discharge port of the first oil pump and a discharge port of the second oil pump via an oil passage, while the oil passage is configured to, during reverse travel, cause the first oil pump to operate as a hydraulic motor by supplying oil discharged from the discharge port of the second oil pump to the discharge port of the first oil pump via the oil passage.

With the hybrid vehicle of the above aspect, during reverse travel, oil discharged from the discharge port of the second oil pump is supplied to the discharge port of the first oil pump, and the first oil pump operates as a hydraulic motor. Therefore, a driving force in a direction to cause the vehicle to move backward can be generated by the first oil pump. Thus, a driving force during reverse travel can be compensated, and shortage of driving force during reverse travel can be resolved.

In the hybrid vehicle of the above aspect, the oil passage may include a change-over valve. The change-over valve may be configured to, during forward travel, switch into a first state where oil discharged from the discharge port of the first oil pump and the discharge port of the second oil pump is supplied to the components to be cooled or lubricated via the oil passage, while the change-over valve may be configured to, during reverse travel, switch into a second state where oil discharged from the discharge port of the second oil pump is supplied to the discharge port of the first oil pump via the oil passage.

With the hybrid vehicle of the above aspect, during forward travel, the change-over valve is switched into the first state, and oil discharged from the discharge port of the first oil pump and the discharge port of the second oil pump is supplied to the components to be cooled or lubricated via the oil passage. On the other hand, during reverse travel, the change-over valve is switched into the second state, and oil discharged from the second oil pump is supplied via the oil passage to the discharge port of the first oil pump, so the first oil pump can be operated as a hydraulic motor. In this way, the change-over valve is switched between the first state and the second state, so the first oil pump can be operated as a hydraulic motor only during reverse travel.

In the hybrid vehicle of the above aspect, the change-over valve may be configured to switch whether to supply oil to at least part of the components to be cooled or lubricated.

With the hybrid vehicle of the above aspect, although oil is not supplied to part of the components to be cooled or lubricated during reverse travel, the amount of oil that is supplied to the first oil pump increases as compared to the case where oil is supplied to all the components to be cooled or lubricated. Therefore, a power that is transmitted to the drive wheel can be increased.

In the hybrid vehicle of the above aspect, the oil passage may include an orifice.

With the hybrid vehicle of the above aspect, during reverse travel, oil discharged from the second oil pump is supplied to the discharge port of the first oil pump via the orifice, so the first oil pump can be operated as a hydraulic motor. In addition, the amount of oil that is supplied to the discharge port of the first oil pump during reverse travel can be adjusted by adjusting the opening degree of the orifice.

In the hybrid vehicle of the above aspect, the rotational driving source may be the engine.

With the hybrid vehicle of the above aspect, during reverse travel, when the engine that serves as the rotational driving source is rotated, the second oil pump is driven, and oil discharged from the discharge port of the second oil pump is supplied to the discharge port of the first oil pump via the oil passage. Therefore, during reverse travel, the first oil pump can be operated as a hydraulic motor.

The hybrid vehicle of the above aspect may further include a power distribution mechanism configured to distribute a power of the engine between a differential motor and the output part. During reverse travel, the engine of the hybrid vehicle may be rotated by a power of the differential motor via the power distribution mechanism.

With the hybrid vehicle of the above aspect, during reverse travel, the differential motor is driven, and the power of the differential motor is transmitted to the engine via the power distribution mechanism. Therefore, the second oil pump can be driven.

In the hybrid vehicle of the above aspect, the rotational driving source may be an electric motor.

With the hybrid vehicle of the above aspect, during reverse travel, the electric motor that serves as the rotational driving source is driven, and oil discharged from the discharge port of the second oil pump is supplied to the discharge port of the first oil pump, so the first oil pump can be operated as a hydraulic motor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a view that shows the flow of energy during reverse travel in the hybrid vehicle of FIG. 4;

FIG. 6 is a table that shows modes of combinations of components to be cooled or lubricated, other than a first oil pump, which are supplied with oil during reverse travel according to a third embodiment of the disclosure;

DETAILED DESCRIPTION OF EMBODIMENTS

Hereinafter, embodiments of the disclosure will be described with reference to the accompanying drawings. In the following embodiments, drawings are simplified or deformed where appropriate, and the scale ratio, shape, and the like, of each component is not always drawn accurately.

Figure 1:
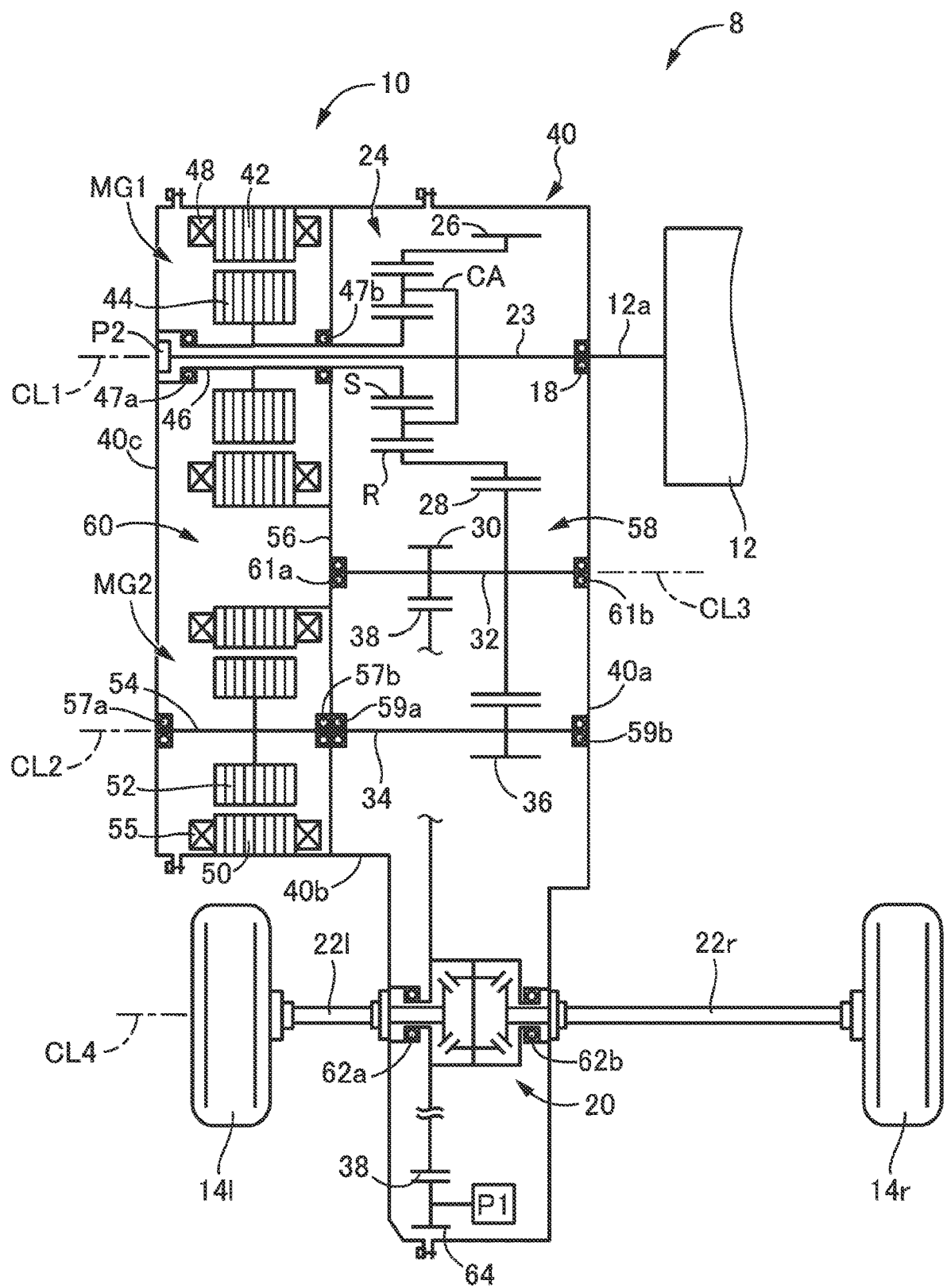
FIG. 1 is a skeletal diagram that schematically shows the configuration of a hybrid vehicle according to a first embodiment of the disclosure.

FIG. 1 is a skeletal diagram that schematically shows the configuration of a hybrid vehicle 8 (hereinafter, referred to as vehicle 8) of a first embodiment of the disclosure. The vehicle 8 includes a vehicle drivetrain 10 (hereinafter, referred to as drivetrain 10) between an engine 12 and a pair of right and left drive wheels 14r, 14l (referred to as drive wheels 14 when not distinguished from each other). The drivetrain 10 is used in a front-engine, front-wheel drive (FF) hybrid vehicle. The drivetrain 10 is a hybrid drivetrain that transmits a power output from at least one of the engine 12 or a second electric motor MG2, which are driving force sources, to the right and left drive wheels 14r, 14l via a differential gear set 20, a pair of right and left axles 22r, 22l, and other components.

As shown in FIG. 1, the drivetrain 10 includes an input shaft 23, a planetary gear train 24, a first electric motor MG1, an output gear 26, a power transmission shaft 34, the second electric motor MG2, a reduction gear 36, a counter shaft 32, a counter gear 28, a differential drive gear 30, the differential gear set 20, and the axles 22r, 22l. The input shaft 23 is disposed so as to be rotatable about a first axis CL1. The planetary gear train 24, the first electric motor MG1, and the output gear 26 are disposed radially outward of the input shaft 23. The power transmission shaft 34 is disposed so as to be rotatable about a second axis CL2. The second electric motor MG2 is disposed coaxially with the power transmission shaft 34. The reduction gear 36 is provided on the power transmission shaft 34. The counter shaft 32 is disposed so as to be rotatable about a third axis CL3. The counter gear 28 and the differential drive gear 30 are provided on the counter shaft 32. The differential gear set 20 and the axles 22r, 22l are disposed so as to be rotatable about a fourth axis CL4. All of these rotating members are accommodated in a casing 40 that is a non-rotating member. The first axis CL1, the second axis CL2, the third axis CL3, and the fourth axis CL4 each are a rotation axis disposed parallel to the direction of the vehicle width of the vehicle 8.

Each of the first electric motor MG1 and the second electric motor MG2 is an electric motor having at least one of the function of a motor that generates mechanical power from electric energy or the function of a generator that generates electric energy from mechanical power, and is a motor generator that is selectively operated as a motor or a generator. The first electric motor MG1 has a generator function for providing a reaction force against the engine 12 and a motor function of driving the engine 12 stopped in operation. The second electric motor MG2 has a motor function for serving as a drive motor that outputs driving force as a driving force source and a generator function of generating electric energy through regeneration from a counter driving force transmitted from the drive wheels 14 side. The first electric motor MG1 is an example of a differential motor of the disclosure. The second electric motor MG2 is an example of a drive motor of the disclosure.

The input shaft 23 is coupled to the engine 12 via a crankshaft 12a of the engine 12, a damper (not shown), and the like, such that power is transmittable. The input shaft 23 is supported by the casing 40 via a bearing 18, and the like, so as to be rotatable about the first axis CL1.

The planetary gear train 24 is disposed around the first axis CL1, and is a single-pinion planetary gear train (differential mechanism) including a sun gear S, a carrier CA, and a ring gear R. The planetary gear train 24 functions as a power distribution mechanism that distributes the power of the engine 12 between the first electric motor MG1 and the output gear 26. The sun gear S of the planetary gear train 24 is coupled to the first electric motor MG1 such that power is transmittable. The carrier CA is coupled to the engine 12 via the input shaft 23 and the crankshaft 12a such that power is transmittable. The ring gear R is coupled to the output gear 26 such that power is transmittable. The ring gear R and the output gear 26 are made of a composite gear in which these gears are integrally formed.

The first electric motor MG1 is placed in position next to the planetary gear train 24 across a partition wall 56, which is part of the casing 40, in the direction of the first axis CL1. The first electric motor MG1 includes an annular stator 42, an annular rotor 44, and a rotor shaft 46. The stator 42 is fixed to the casing 40 so as to be non-rotatable. The rotor 44 is disposed radially inward of the stator 42. The rotor shaft 46 is coupled to the inner periphery of the rotor 44. A stator coil 48 is wound in the stator 42. The rotor shaft 46 is rotatably supported by the casing 40 via a pair of bearings 47a, 47b disposed on both sides in the axial direction.

The output gear 26 is coupled to the ring gear R of the planetary gear train 24 and is in mesh with the counter gear 28 provided on the counter shaft 32.

The second electric motor MG2 and the reduction gear 36 are disposed so as to be rotatable about the second axis CL2 and disposed next to each other across the partition wall 56 in the direction of the second axis CL2.

The second electric motor MG2 includes an annular stator 50, an annular rotor 52, and a rotor shaft 54. The stator 50 is fixed to the casing 40 so as to be non-rotatable. The rotor 52 is disposed radially inward of the stator 50. The rotor shaft 54 is coupled to the inner periphery of the rotor 52. A stator coil 55 is wound in the stator 50. The rotor shaft 54 is rotatably supported by the casing 40 via a pair of bearings 57a, 57b disposed on both sides in the axial direction.

The reduction gear 36 is provided integrally with the power transmission shaft 34 and is in mesh with the counter gear 28 provided on the counter shaft 32. The number of teeth of the reduction gear 36 is set so as to be less than the number of teeth of the counter gear 28, so the rotation of the second electric motor MG2 is reduced in speed and transmitted to the counter shaft 32 via the reduction gear 36 and the counter gear 28. The power transmission shaft 34 is rotatably supported by the casing 40 via a pair of bearings 59a, 59b disposed on both sides in the axial direction.

The counter shaft 32 is rotatably supported by the casing 40 via a pair of bearings 61a, 61b disposed on both sides in the axial direction.

The counter gear 28 and the differential drive gear 30 are provided on the counter shaft 32 so as to be relatively non-rotatable. The counter shaft 32 rotates about the third axis CL3. The counter gear 28 is in mesh with the output gear 26 and the reduction gear 36, and a power output from at least one of the engine 12 or the second electric motor MG2 is transmitted to the counter gear 28. The differential drive gear 30 is in mesh with a differential ring gear 38 of the differential gear set 20. Therefore, when a power is input from at least one of the output gear 26 or the reduction gear 36 to the counter gear 28, the power is transmitted to the differential gear set 20 via the counter shaft 32 and the differential drive gear 30.

The differential gear set 20 and the pair of axles 22r, 22l are disposed so as to be rotatable about the fourth axis CL4. The differential ring gear 38 of the differential gear set 20 is in mesh with the differential drive gear 30, so a power output from at least one of the engine 12 or the second electric motor MG2 is input from the differential ring gear 38 to the differential gear set 20.

The differential gear set 20 is made up of a known differential mechanism. The differential gear set 20 transmits a power to the right and left axles 22r, 22l while permitting the relative rotation between the right and left axles 22r, 22l. Since the differential gear set 20 is a known technique, the description thereof is omitted. The differential gear set 20 is rotatably supported by the casing 40 via a pair of bearings 62a, 62b disposed on both sides in the direction of the fourth axis CL4.

The casing 40 is made up of a housing 40a, an axle case 40b, and a case cover 40c. The axle case 40b has openings at both sides in the direction of the first axis CL1. The housing 40a is fastened by bolts to one of the openings of the axle case 40b, and the case cover 40c is fastened by bolts to the other one of the openings of the axle case 40b.

The axle case 40b has the partition wall 56 perpendicular to the first axis CL1. The inside of the casing 40 is partitioned by the partition wall 56 into a gear chamber 58 and a motor chamber 60. Various gears, such as the planetary gear train 24, the output gear 26, the counter gear 28, the reduction gear 36, and the differential gear set 20, are accommodated in the gear chamber 58. The first electric motor MG1 and the second electric motor MG2 are accommodated in the motor chamber 60.

A pump drive gear 64 is in mesh with the differential ring gear 38. The pump drive gear 64 is used to drive a differential gear-driven oil pump P1 (hereinafter, differential gear-driven pump P1). The differential gear-driven pump P1 is a mechanical oil pump that is connected to the differential ring gear 38 of the differential gear set 20 via the pump drive gear 64 such that power is transmittable. The differential gear-driven pump P1 is configured to be mechanically driven with the rotation of the differential ring gear 38 of the differential gear set 20 as the differential ring gear 38 rotates in a forward travel direction (forward travel rotation direction) and discharge oil. The differential gear-driven pump P1 is an example of a first oil pump of the disclosure. The differential ring gear 38 is an example of part of an output part of the disclosure.

A mechanical engine-driven oil pump P2 (hereinafter, engine-driven pump P2) is provided along the first axis CL1 at an end of the input shaft 23 in the axial direction across from the engine 12. The engine-driven pump P2 is driven by the engine 12. A drive gear (not shown) that is a component of the engine-driven pump P2 is connected to a shaft end portion of the input shaft 23. The engine-driven pump P2 is driven with the rotation of the engine 12. Therefore, the engine 12 functions as a rotational driving source of the engine-driven pump P2, and oil is discharged from the engine-driven pump P2 as the engine 12 rotates. In this way, the rotational driving source of the engine-driven pump P2 that is driven by the engine 12 is different from a rotational driving source of the differential gear-driven pump P1 that is driven by the differential ring gear 38. The engine-driven pump P2 is an example of a second oil pump of the disclosure. The engine 12 is an example of a rotational driving source different from that of the output part in the disclosure.

In the thus configured drivetrain 10, the power of the engine 12 is transmitted to the right and left drive wheels 14r, 14l via the planetary gear train 24, the output gear 26, the counter gear 28, the counter shaft 32, the differential drive gear 30, the differential gear set 20, and the axles 22r, 22l. The power of the second electric motor MG2 is transmitted to the right and left drive wheels 14r, 14l via the rotor shaft 54, the power transmission shaft 34, the reduction gear 36, the counter gear 28, the counter shaft 32, the differential drive gear 30, the differential gear set 20, and the axles 22r, 22l. In the specification, power is synonymous with torque and driving force. In the first embodiment, members mechanically coupled to the drive wheels 14, that is, members that are rotated with the drive wheels 14, are examples of the output part of the disclosure. Specifically, examples of the output part of the disclosure include the output gear 26, the counter gear 28, the differential drive gear 30, the counter shaft 32, the power transmission shaft 34, the reduction gear 36, the differential gear set 20 including the differential ring gear 38, and the right and left axles 22r, 22l.

The vehicle 8 is able to travel in a motor drive mode (EV mode) or a hybrid drive mode (HV mode). In the motor drive mode (EV mode), the vehicle 8 travels by using the second electric motor MG2. In the hybrid drive mode (HV mode), the vehicle 8 travels by using the engine 12 and the second electric motor MG2. The drive mode is shifted as needed between the EV mode and the HV mode in accordance with, for example, a predetermined shift map using required driving force (such as accelerator operation amount) and vehicle speed as parameters.

In the EV mode, the vehicle 8 travels by using only the second electric motor MG2 as the driving force source while the engine 12 is stopped. The EV mode is used in a relatively low-load, low vehicle speed region. Even in a driving region in which the EV mode is used, when the state of charge (remaining level of charge) of a battery 66 (see FIG. 2) is low, the engine 12 is driven and regenerative control with the use of the first electric motor MG1 is executed, and an electric power obtained as a result of the regenerative control is stored in the battery 66.

In the HV mode, the vehicle 8 travels forward by using the engine 12 and the second electric motor MG2 as the driving force sources. The HV mode is used in a higher-load, higher-vehicle speed region than those of the driving region in which the EV mode is used. In the HV mode, the power of the engine 12 is distributed by the planetary gear train 24 between the output gear 26 and the first electric motor MG1, and the power distributed to the output gear 26 is transmitted to the drive wheels 14 via the differential gear set 20, and other components, as a driving force (the direct torque of the engine 12) for propelling the vehicle 8. With the power distributed to the first electric motor MG1, regenerative control over the first electric motor MG1 is executed, and an electric power is generated by the first electric motor MG1. An electric power generated by the first electric motor MG1 is supplied to the second electric motor MG2 or stored in the battery 66. The second electric motor MG2 generates a power by using at least one of an electric power stored in the battery 66 or an electric power generated by the first electric motor MG1 and transmits the power to the drive wheels 14. In this way, in the HV mode, the vehicle 8 travels forward by using the engine 12 and the second electric motor MG2.

During reverse travel, the vehicle 8 travels by using only the second electric motor MG2 as the driving force source while the engine 12 is stopped. In this way, during reverse travel, the vehicle 8 travels by using only the second electric motor MG2; however, since no power is transmitted from the engine 12, there are concerns about shortage of driving force. In this regard, during reverse travel, oil is discharged from a discharge port 84b (see FIG. 3) of the engine-driven pump P2 by driving the engine-driven pump P2, and the oil discharged from the engine-driven pump P2 is supplied to the discharge port 82b (see FIG. 3) of the differential gear-driven pump P1. As a result, the differential gear-driven pump P1 is operated as a hydraulic motor, and a power generated by the differential gear-driven pump P1 is transmitted to the drive wheels 14 via the differential gear set 20.

Figure 2:
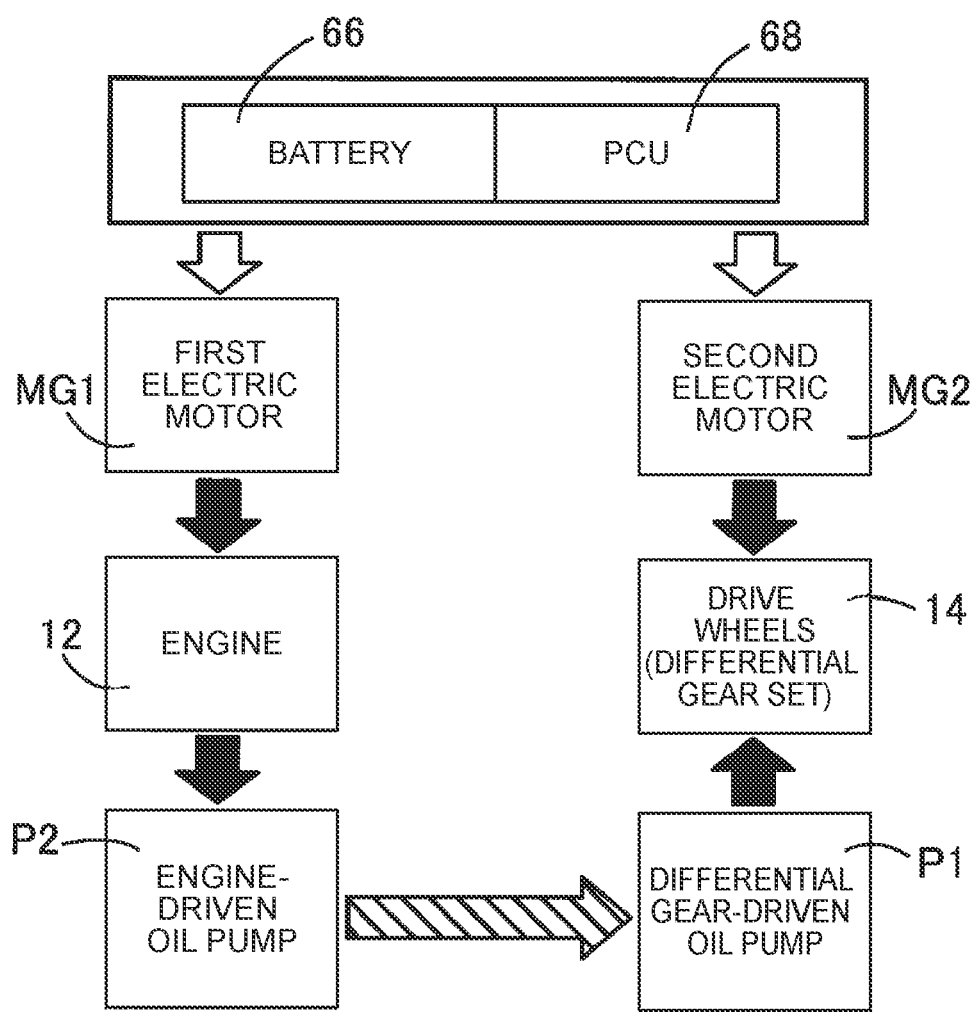
FIG. 2 is a view that shows the flow of energy during reverse travel in a drivetrain of FIG. 1.

FIG. 2 shows the flow of energy in the drivetrain 10 during reverse travel in the first embodiment. In FIG. 2, the battery 66 and a power control unit (PCU) 68 are shown at the top. The battery 66 is used to supply an electric power to drive the first electric motor MG1 and the second electric motor MG2. The PCU 68 controls the drive statuses of the first electric motor MG1 and second electric motor MG2.

The outlined arrows drawn from the battery 66 and the PCU 68 toward the first electric motor MG1 and the second electric motor MG2 respectively represent the flows of electric energy to be supplied to the first electric motor MG1 and the second electric motor MG2. In other words, during reverse travel, the first electric motor MG1 and the second electric motor MG2 are driven by an electric power from the battery 66.

The solid arrow between the first electric motor MG1 and the engine 12 represents energy (mechanical energy) that is used to rotate the engine 12 with the first electric motor MG1. The first electric motor MG1 rotates the engine 12 (motoring) via the planetary gear train 24 by using an electric power from the battery 66. In this way, during reverse travel, the engine 12 is rotated via the planetary gear train 24 by the power of the first electric motor MG1.

The solid arrow between the second electric motor MG2 and the drive wheels 14 represents the flow of energy (mechanical energy) that is used by the second electric motor MG2 to cause the vehicle 8 to travel backward. The second electric motor MG2 causes the vehicle 8 to travel backward by transmitting a power that acts in a reverse travel direction (reverse travel rotation direction) to the drive wheels 14 via the differential gear set 20 and other components.

The solid arrow between the engine 12 and the engine-driven pump P2 represents the flow of energy (mechanical energy) that is used to drive the engine-driven pump P2 with the engine 12. Since the engine-driven pump P2 is connected to the engine 12 such that power is transmittable, the engine 12 is rotated as a result of motoring of the engine 12 with the use of the first electric motor MG1, so the engine-driven pump P2 is driven.

The diagonally-shaded arrow between the engine-driven pump P2 and the differential gear-driven pump P1 represents a hydraulic path through which oil that is discharged from the discharge port 84b of the engine-driven pump P2 is supplied to the discharge port 82b of the differential gear-driven pump P1. When oil discharged from the discharge port 84b of the engine-driven pump P2 is supplied to the discharge port 82b of the differential gear-driven pump P1, the differential gear-driven pump P1 is rotated in the reverse direction relative to the rotation during forward travel. At this time, a power that acts in a direction to cause the vehicle 8 to travel backward is generated in the differential gear-driven pump P1. In this way, during reverse travel, oil is supplied to the discharge port 82b of the differential gear-driven pump P1, with the result that the differential gear-driven pump P1 operates as a hydraulic motor that generates a power that acts in the reverse travel direction.

The solid arrow between the differential gear-driven pump P1 and the drive wheels 14 represents the flow of energy (mechanical energy) that transmits a power generated in the differential gear-driven pump P1 to the drive wheels 14 via the differential gear set 20. Since the differential gear-driven pump P1 is coupled to the differential gear set 20 via the pump drive gear 64 such that power is transmittable, a power generated by the differential gear-driven pump P1 is transmitted to the drive wheels 14 via the differential gear set 20 and other components.

As described above, during reverse travel of the vehicle 8, the differential gear-driven pump P1 is operated as a hydraulic motor, and a power generated in the differential gear-driven pump P1 to act in the reverse travel direction is transmitted to the drive wheels 14 via the differential gear set 20 and other components. Hence, shortage of driving force during reverse travel of the vehicle 8 is resolved. In addition, during reverse travel, the engine 12 is rotated through motoring by the first electric motor MG1, so a power that acts in a direction to interfere with reverse travel and that is generated when the engine 12 is caused to autonomously operate is not generated.

Figure 3:
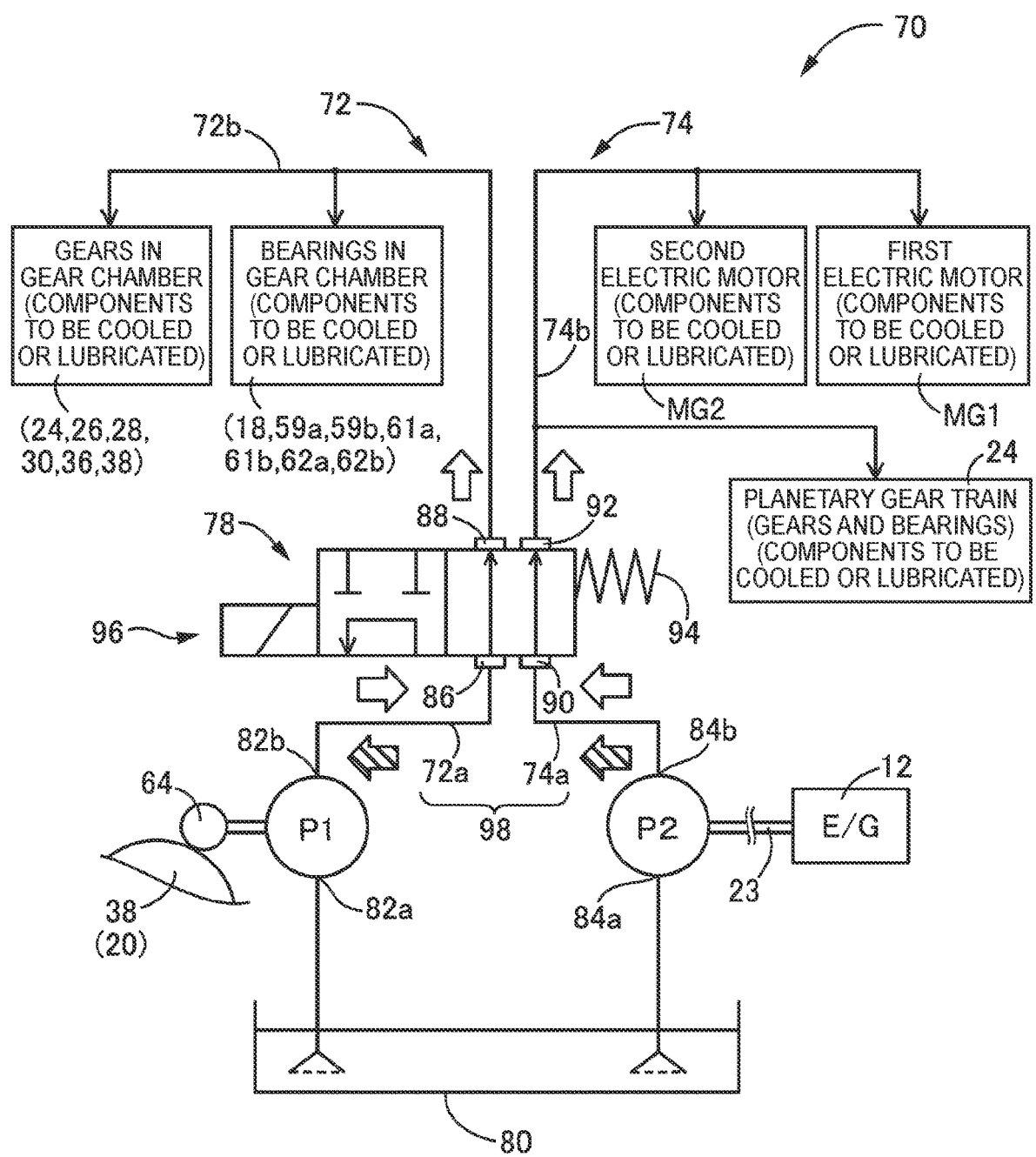
FIG. 3 is a schematic diagram of a lubrication and cooling system that is provided in the hybrid vehicle of the first embodiment and that supplies oil to components to be cooled or lubricated in the drivetrain of FIG. 1.

FIG. 3 is a schematic diagram of a lubrication and cooling system 70 for supplying oil to components to be cooled or lubricated in the drivetrain 10, and shows a structure that, during reverse travel, allows oil discharged from the discharge port 84b of the engine-driven pump P2 to be supplied to the discharge port 82b of the differential gear-driven pump P1.

The lubrication and cooling system 70 is configured to be able to supply oil discharged from the differential gear-driven pump P1 or the engine-driven pump P2 to the components to be cooled or lubricated in the drivetrain 10. The components to be cooled or lubricated correspond to components that require lubrication and cooling during travel and correspond to the first electric motor MG1, the second electric motor MG2, the gears 24, 26, 28, 30, 36, 38, and the like, in the gear chamber 58, the bearings 18, 59a, 59b, 61a, 61b, 62a, 62b in the gear chamber 58, and the like, in the drivetrain 10.

The lubrication and cooling system 70 includes a differential gear-driven pump P1, an engine-driven pump P2, a first oil passage 72, a second oil passage 74, a change-over valve 78, and an oil pan 80. The first oil passage 72 is an oil passage for supplying oil discharged from the discharge port 82b of the differential gear-driven pump P1 to the gears 24, 26, 28, 30, 36, 38, and the like, in the gear chamber 58 and the bearings 18, 59a, 59b, 61a, 61b, 62a, 62b in the gear chamber 58. The second oil passage 74 is an oil passage for supplying oil discharged from the discharge port 84b of the engine-driven pump P2 to the first electric motor MG1, the second electric motor MG2, the gears of the planetary gear train 24, and bearings (not shown) that support the gears of the planetary gear train 24. The change-over valve 78 is inserted between the first oil passage 72 and the second oil passage 74. Oil inside the casing 40 is pooled in the oil pan 80. The gears and bearings of the planetary gear train 24 are supplied with oil from both the first oil passage 72 ad the second oil passage 74.

The differential gear-driven pump P1 is connected to the differential ring gear 38 of the differential gear set 20 via the pump drive gear 64 such that power is transmittable. Therefore, when the differential ring gear 38 rotates during forward travel of the vehicle 8, the differential gear-driven pump P1 is mechanically driven via the pump drive gear 64. At this time, oil pooled in the oil pan 80 is pumped, introduced from a suction port 82a of the differential gear-driven pump P1, and discharged from the discharge port 82b of the differential gear-driven pump P1. The oil discharged from the discharge port 82b is supplied to the first oil passage 72.

Since the engine-driven pump P2 is connected to the engine 12 via the input shaft 23 such that power is transmittable, the engine-driven pump P2 is driven with the rotation of the engine 12. For example, when the engine 12 rotates during the HV mode, the engine-driven pump P2 is driven.

When the engine-driven pump P2 is driven, oil pooled in the oil pan 80 is pumped, introduced from a suction port 84a of the engine-driven pump P2, and discharged from the discharge port 84b of the engine-driven pump P2. The oil discharged from the discharge port 84b of the engine-driven pump P2 is supplied to the second oil passage 74.

The first oil passage 72 connects the differential gear-driven pump P1 with the gears in the gear chamber 58 and the bearings in the gear chamber 58. Therefore, oil discharged from the differential gear-driven pump P1 is supplied to the gears in the gear chamber 58 and the bearings in the gear chamber 58 through the first oil passage 72. The change-over valve 78 is inserted in the first oil passage 72. The change-over valve 78 is able to communicate or interrupt the first oil passage 72. The first oil passage 72 is divided into a first input oil passage 72a and a first output oil passage 72b at a boundary set to the change-over valve 78. The first input oil passage 72a is defined as a part of the first oil passage 72, connected to the differential gear-driven pump P1, for the sake of convenience. The first output oil passage 72b is defined as the other part of the first oil passage 72, connected to the gears in the gear chamber 58 and the bearings in the gear chamber 58, for the sake of convenience.

The second oil passage 74 connects the engine-driven pump P2 with the first electric motor MG1, the second electric motor MG2, and the gears and bearings of the planetary gear train 24. Therefore, oil discharged from the engine-driven pump P2 is supplied to the first electric motor MG1, the second electric motor MG2, and the gears and bearings of the planetary gear train 24 through the second oil passage 74. The change-over valve 78 is inserted in the second oil passage 74. The change-over valve 78 is able to communicate or interrupt the second oil passage 74. The second oil passage 74 is divided into a second input oil passage 74a and a second output oil passage 74b with a boundary set to the change-over valve 78. The second input oil passage 74a is defined as a part of the second oil passage 74, connected to the engine-driven pump P2, for the sake of convenience. The second output oil passage 74b is defined as the other part of the second oil passage 74, connected to the first electric motor MG1, the second electric motor MG2, and the gears and bearings of the planetary gear train 24, for the sake of convenience.

The change-over valve 78 is inserted between the first oil passage 72 and the second oil passage 74. The change-over valve 78 is configured to be able to switch between a first state and a second state. In the first state, oil discharged from the differential gear-driven pump P1 is supplied to the gears in the gear chamber 58 and the bearings in the gear chamber 58, and oil discharged from the engine-driven pump P2 is supplied to the first electric motor MG1, the second electric motor MG2, and the gears and bearings of the planetary gear train 24. In the second state, oil discharged from the discharge port 84b of the engine-driven pump P2 is supplied to the discharge port 82b of the differential gear-driven pump P1. The change-over valve 78 is switched into the first state during forward travel of the vehicle 8, and switched into the second state during reverse travel of the vehicle 8.

The change-over valve 78 includes a first port 86, a second port 88, a third port 90, a fourth port 92, a spool valve element (not shown), a spring 94, and a solenoid 96. The first port 86 is connected to the first input oil passage 72a. The second port 88 is connected to the first output oil passage 72b. The third port 90 is connected to the second input oil passage 74a. The fourth port 92 is connected to the second output oil passage 74b. The spool valve element is used to change the status of communication among the first port 86, the second port 88, the third port 90, and the fourth port 92. The spring 94 urges the spool valve element to a position in which the change-over valve 78 is placed in the first state. The solenoid 96 is used to, when energized, move the spool valve element to a position in which the change-over valve 78 is placed in the second state.

FIG. 3 shows a state where, during forward travel of the vehicle 8, the change-over valve 78 is switched into the above-described first state. At this time, the first port 86 and the second port 88 communicate with each other, and the third port 90 and the fourth port 92 communicate with each other. Therefore, the first input oil passage 72a and the first output oil passage 72b are connected via the change-over valve 78, and oil discharged from the discharge port 82b of the differential gear-driven pump P1 is supplied to the gears in the gear chamber 58 and the bearings in the gear chamber 58 through the first oil passage 72. In addition, the second input oil passage 74a and the second output oil passage 74b are connected via the change-over valve 78, and oil discharged from the discharge port 84b of the engine-driven pump P2 is supplied to the first electric motor MG1, the second electric motor MG2, and the gears and bearings of the planetary gear train 24 through the second oil passage 74. In this way, during forward travel, oil discharged from the discharge port 82b of the differential gear-driven pump P1 or discharge from the discharge port 84b of the engine-driven pump P2 is supplied to the components to be cooled or lubricated in the drivetrain 10.

On the other hand, during reverse travel of the vehicle 8, the change-over valve 78 is switched into the above-described second state. During reverse travel, when the solenoid 96 is energized, a thrust that acts in a direction against the urging force of the spring 94 is applied to the spool valve element of the change-over valve 78. As a result, the spool valve element is moved against the urging force of the spring 94, and the change-over valve 78 is switched into the second state. At this time, in the change-over valve 78, the first port 86 and the third port 90 communicate with each other, while communication between the first port 86 and the second port 88 and communication between the third port 90 and the fourth port 92 are interrupted. Therefore, the second input oil passage 74a is connected to the first input oil passage 72a via the change-over valve 78, so, as represented by the diagonally-shaded arrows, oil discharged from the discharge port 84b of the engine-driven pump P2 is supplied to the discharge port 82b of the differential gear-driven pump P1 via the second input oil passage 74a, the change-over valve 78, and the first input oil passage 72a.

The first input oil passage 72a, the second input oil passage 74a, and the change-over valve 78 make up an oil passage 98 that supplies oil discharged from the discharge port 84b of the engine-driven pump P2 to the discharge port 82b of the differential gear-driven pump P1 during reverse travel. The change-over valve 78 is configured to, during forward travel, be switched into the first state where oil discharged from the discharge port 82b of the differential gear-driven pump P1 or discharged from the discharge port 84b of the engine-driven pump P2 to the components to be cooled or lubricated via the oil passage 98, while the change-over valve 78 is configured to, during reverse travel, be switched into the second state where oil discharged from the discharge port 84b of the engine-driven pump P2 is supplied to the discharge port 82b of the differential gear-driven pump P1 via the oil passage 98.

Thus, during reverse travel, the differential gear-driven pump P1 is rotated in the reverse direction by oil discharged from the discharge port 84b of the engine-driven pump P2, and the differential gear-driven pump P1 operates as a hydraulic motor that generates a power to act in the reverse travel direction. Then, the power generated by the differential gear-driven pump P1 is transmitted to the drive wheels 14 through the differential gear set 20 and other components. In this way, during reverse travel, in addition to a power that is output from the second electric motor MG2 and that acts in the reverse travel direction, a power that is generated by the differential gear-driven pump P1 and that acts in the reverse travel direction is applied, so shortage of driving force during reverse travel is resolved.

As described above, according to the first embodiment, during reverse travel, oil discharged from the discharge port 84b of the engine-driven pump P2 is supplied to the discharge port 82b of the differential gear-driven pump P1, and the differential gear-driven pump P1 operates as a hydraulic motor, so a driving force in a direction to cause the vehicle 8 to travel backward can be generated by the differential gear-driven pump P1. Thus, a driving force during reverse travel can be compensated, and shortage of driving force during reverse travel can be resolved.

According to the first embodiment, during forward travel, the change-over valve 78 is switched into the first state, and the oil passage that connects the discharge port 82b of the differential gear-driven pump P1 and the discharge port 84b of the engine-driven pump P2 is interrupted. In this state, oil discharged from the discharge port 82b of the differential gear-driven pump P1 and oil discharged from the discharge port 84b of the engine-driven pump P2 each are supplied to the components to be cooled or lubricated in the drivetrain 10 via an associated one of the first input oil passage 72a and the second input oil passage 74a. On the other hand, during reverse travel, the change-over valve 78 is switched into the second state, and the oil passage that connects the discharge port 82b of the differential gear-driven pump P1 and the discharge port 84b of the engine-driven pump P2 is communicated. In this state, oil discharged from the discharge port 84b of the engine-driven pump P2 is supplied to the discharge port 82b of the differential gear-driven pump P1 via the second input oil passage 74a and the first input oil passage 72a. As a result, the differential gear-driven pump P1 can be operated as a hydraulic motor. In this way, by switching the change-over valve 78 between the first state and the second state, the differential gear-driven pump P1 can be operated as a hydraulic motor only during reverse travel.

According to the first embodiment, during reverse travel, the engine-driven pump P2 can be driven by driving the first electric motor MG1 and transmitting the power of the first electric motor MG1 to the engine 12 via the planetary gear train 24.

Next, other embodiments of the disclosure will be described. Like reference signs denote portions common to the above-described first embodiment in the following description, and the description thereof will not be repeated.

Figure 4:
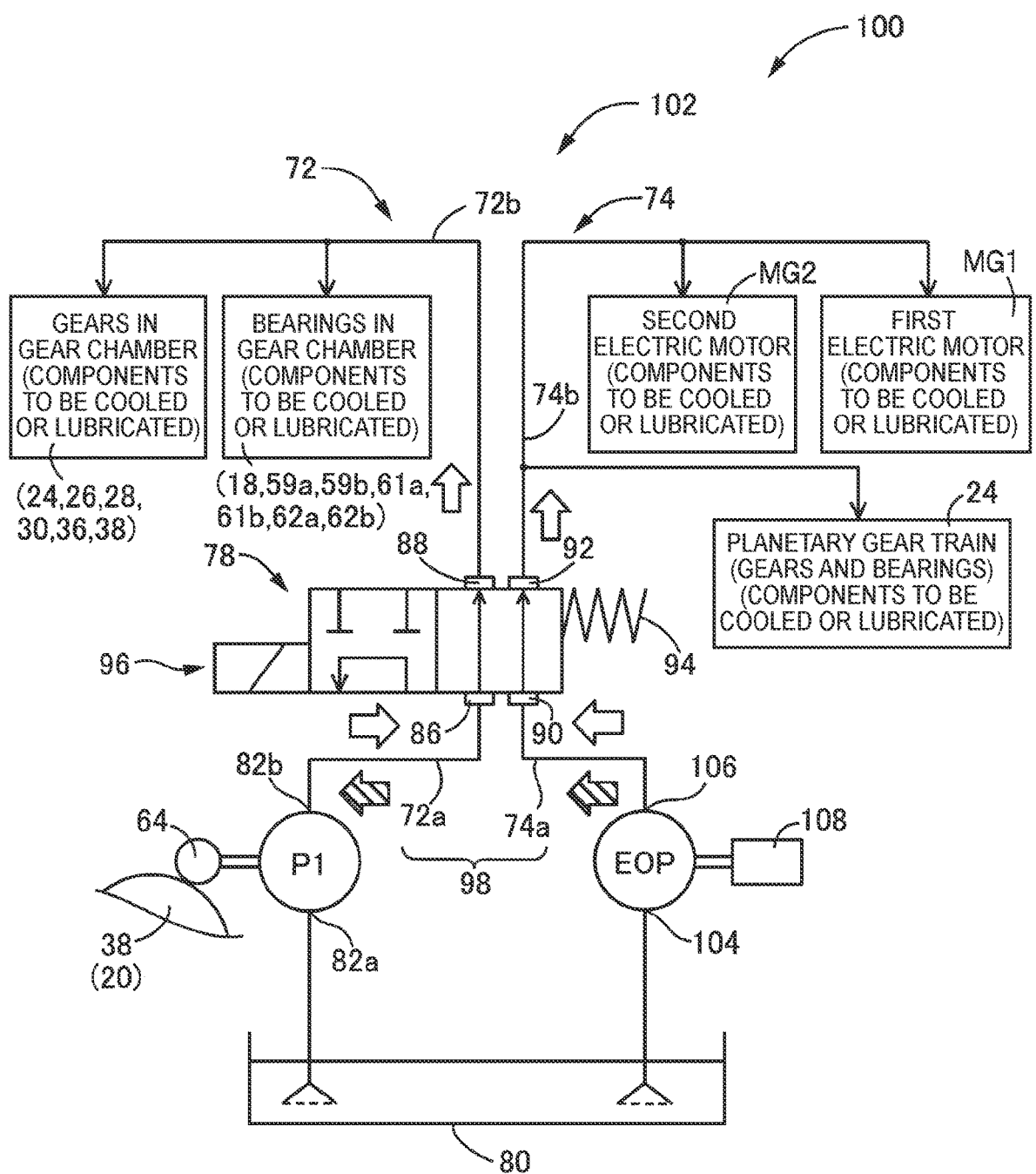
FIG. 4 is a schematic diagram of a lubrication and cooling system provided in a hybrid vehicle according to a second embodiment of the disclosure.

FIG. 4 is a schematic diagram of a lubrication and cooling system 102 provided in a hybrid vehicle 100 (hereinafter, referred to as vehicle 100) according to a second embodiment of the disclosure. When the lubrication and cooling system 102 of FIG. 4 is compared with the lubrication and cooling system 70 of the above-described first embodiment, an electric oil pump EOP that is driven by an electric motor 108 is used instead of the engine-driven pump P2 that is driven by the engine 12 of the above-described first embodiment. The other structure is the same as that of the lubrication and cooling system 70 of the above-described first embodiment, so the description thereof is omitted. The electric oil pump EOP is an example of the second oil pump of the disclosure.

As shown in FIG. 4, the electric oil pump EOP is driven by the electric motor 108 that serves as a rotational driving source. When the electric oil pump EOP is driven, oil pooled in the oil pan 80 is pumped, introduced from a suction port 104 of the electric oil pump EOP, and discharged from a discharge port 106. The oil discharged from the discharge port 106 is supplied to the second oil passage 74. The electric oil pump EOP is driven as needed according to the traveling condition of the vehicle 100. In a traveling condition in which the temperatures of the first electric motor MG1 and second electric motor MG2 are easy to increase, for example, during travel at a high load on the first electric motor MG1 and the second electric motor MG2, or the like, the electric oil pump EOP is driven, and oil is discharged from the electric oil pump EOP. Thus, oil discharged from the electric oil pump EOP is supplied to the first electric motor MG1, the second electric motor MG2, and the gears and bearings of the planetary gear train 24 through the second oil passage 74, so the first electric motor MG1 and the second electric motor MG2 are efficiently cooled.

During reverse travel of the vehicle 100, the electric oil pump EOP is driven. During reverse travel, the change-over valve 78 is switched into the above-described second state, and the first port 86 and the third port 90 are communicated. Therefore, oil discharged from the discharge port 106 of the electric oil pump EOP is supplied to the discharge port 82b of the differential gear-driven pump P1 through the second input oil passage 74a, the change-over valve 78, and the first input oil passage 72a. Thus, the differential gear-driven pump P1 is rotated in the reverse direction by oil that is discharged from the electric oil pump EOP, and the differential gear-driven pump P1 is operated as a hydraulic motor.

FIG. 5 shows the flow of energy during reverse travel in the vehicle 100. As shown in FIG. 5, during reverse travel, when an electric power is supplied from the battery 66 to the second electric motor MG2, a power that causes the vehicle 100 to travel backward is output from the second electric motor MG2, and a power to act in the reverse travel direction is transmitted to the drive wheels 14 via the differential gear set 20.

The electric oil pump EOP is driven by using an electric power from the battery 66, and oil is discharged from the discharge port 106 of the electric oil pump EOP. Here, during reverse travel, the change-over valve 78 is switched into the second state, so oil discharged from the discharge port 106 of the electric oil pump EOP is supplied to the discharge port 82b of the differential gear-driven pump P1 through the second input oil passage 74a, the change-over valve 78, and the first input oil passage 72a. The diagonally-shaded arrow in FIG. 5 represents the flow (hydraulic path) of the above-described oil.

When oil is supplied to the discharge port 82b of the differential gear-driven pump P1, the differential gear-driven pump P1 is rotated in the reverse direction, and the differential gear-driven pump P1 operates as a hydraulic motor that generates a power to act in the reverse travel direction. Therefore, a power generated in the differential gear-driven pump P1 is transmitted to the drive wheels 14 via the differential gear set 20, and a power that acts in the reverse travel direction is applied to the drive wheels 14.

In this way, even when the electric oil pump EOP is used instead of the engine-driven pump P2 of the above-described first embodiment, the differential gear-driven pump P1 can be operated as a hydraulic motor by driving the electric oil pump EOP and supplying oil discharged from the electric oil pump EOP to the discharge port 82b of the differential gear-driven pump P1 during reverse travel. As a result, a power that is generated in the differential gear-driven pump P1 and that acts in the reverse travel direction is transmitted to the drive wheels 14 via the differential gear set 20, so shortage of driving force during reverse travel is resolved. Therefore, according to the second embodiment as well, similar advantageous effects to those of the above-described first embodiment are obtained.

In the above-described first embodiment, when the change-over valve 78 is switched into the second state during reverse travel, the first oil passage 72 and the second oil passage 74 are interrupted, and supply of oil to the gears and bearings in the gear chamber 58, the first electric motor MG1, the second electric motor MG2, and the like, is interrupted. However, even in a state where the change-over valve 78 is switched into the second state during reverse travel, oil may be supplied to the gears, and the like, in the gear chamber 58 as needed.

FIG. 6 is a table that shows modes of combinations of components to be cooled or lubricated, other than the differential gear-driven pump P1, during reverse travel according to a third embodiment. In FIG. 6, "GEARS AND BEARINGS IN GEAR CHAMBER" correspond to the gears in the gear chamber 58 and the bearings in the gear chamber 58, which are the components to be cooled or lubricated, "MG" corresponds to the first electric motor MG1 and the second electric motor MG2, which are the components to be cooled or lubricated, and "GEARS AND BEARINGS OF PLANETARY GEAR TRAIN" correspond to the gears and bearings of the planetary gear train 24, which are the components to be cooled or lubricated. In FIG. 6, "SUPPLIED" indicates that oil is supplied during reverse travel, and "NOT SUPPLIED" indicates that oil is not supplied during reverse travel.

Mode 1 shown in FIG. 6 corresponds to the mode in which, during reverse travel, oil is supplied to the differential gear-driven pump P1, but oil is not supplied to none of the components to be cooled or lubricated. Mode 1 corresponds to the above-described first embodiment. In this case, during reverse travel, oil is not supplied to the components to be cooled or lubricated; however, the amount of oil that is supplied to the differential gear-driven pump P1 is greater than those of the other modes (Mode 2 to Mode 8), so a power that is transmitted to the drive wheels 14 is the greatest among all the modes.

Mode 2 shown in FIG. 6 indicates that, during reverse travel, oil is supplied to the differential gear-driven pump P1, the gears in the gear chamber 58, and the bearings in the gear chamber 58. Mode 3 indicates that, during reverse travel, oil is supplied to the differential gear-driven pump P1, the first electric motor MG1, and the second electric motor MG2. Mode 4 indicates that, during reverse travel, oil is supplied to the differential gear-driven pump P1, and the gears and bearings of the planetary gear train 24. Mode 5 indicates that oil is supplied to the differential gear-driven pump P1, the gears in the gear chamber 58, the bearings in the gear chamber 58, the first electric motor MG1, and the second electric motor MG2. Mode 6 indicates that oil is supplied to the differential gear-driven pump P1, the first electric motor MG1, the second electric motor MG2, and the gears and bearings of the planetary gear train 24. Mode 7 indicates that oil is supplied to the differential gear-driven pump P1, the gears in the gear chamber 58, the bearings in the gear chamber 58, and the gears and bearings of the planetary gear train 24. Mode 8 indicates that oil is supplied to the differential gear-driven pump P1, the gears in the gear chamber 58, the bearings in the gear chamber 58, the first electric motor MG1, the second electric motor MG2, and the gears and bearings of the planetary gear train 24.

As shown in Mode 2 to Mode 8, during reverse travel, oil may also be supplied to the components to be cooled or lubricated as needed in addition to the differential gear-driven pump P1. Thus, even during reverse travel, lubrication and cooling of the components to be cooled or lubricated are ensured. In Mode 2 to Mode 8, oil is also supplied to components other than the differential gear-driven pump P1 during reverse travel, and the amount of oil that is supplied to the differential gear-driven pump P1 is less than that of Mode 1, so a power that is generated in the differential gear-driven pump P1 during reverse travel also decreases.

Figure 7:
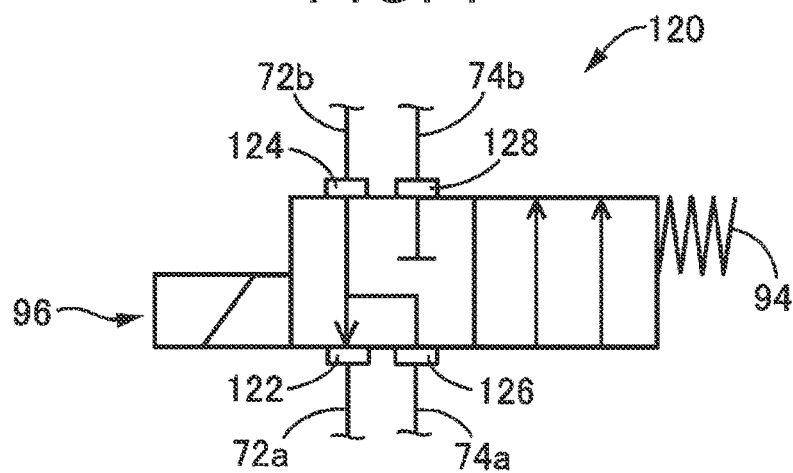
FIG. 7 is a diagram that shows the structure of a change-over valve for achieving Mode 2 of FIG. 6.

In implementing the modes (Mode 2 to Mode 8), the structure of the lubrication and cooling system is modified according to the modes. For example, when Mode 2 is implemented, the change-over valve 78 is replaced with a change-over valve 120 shown in FIG. 7 in the lubrication and cooling system 70 of FIG. 2. FIG. 7 shows a state where the change-over valve 120 is switched into a second state, that is, a state during reverse travel.

The change-over valve 120 is configured, during reverse travel, such that a first port 122 connected to the first input oil passage 72a, a second port 124 connected to the first output oil passage 72b, and a third port 126 connected to the second input oil passage 74a are communicated while a fourth port 128 connected to the second output oil passage 74b is interrupted, as shown in FIG. 7.

When the status of communication of the change-over valve 120 is changed as described above, oil discharged from the engine-driven pump P2 is supplied to the discharge port 82b of the differential gear-driven pump P1 through the second input oil passage 74a, the change-over valve 120, and the first input oil passage 72a and is also supplied to the gears in the gear chamber 58 and the bearings in the gear chamber 58 through the first output oil passage 72b during reverse travel. Therefore, the differential gear-driven pump P1 operates as a hydraulic motor, so a power generated in the differential gear-driven pump P1 to act in the reverse travel direction can be transmitted to the drive wheels 14, and oil can be supplied to the gears in the gear chamber 58 and the bearings in the gear chamber 58.

Figure 8:
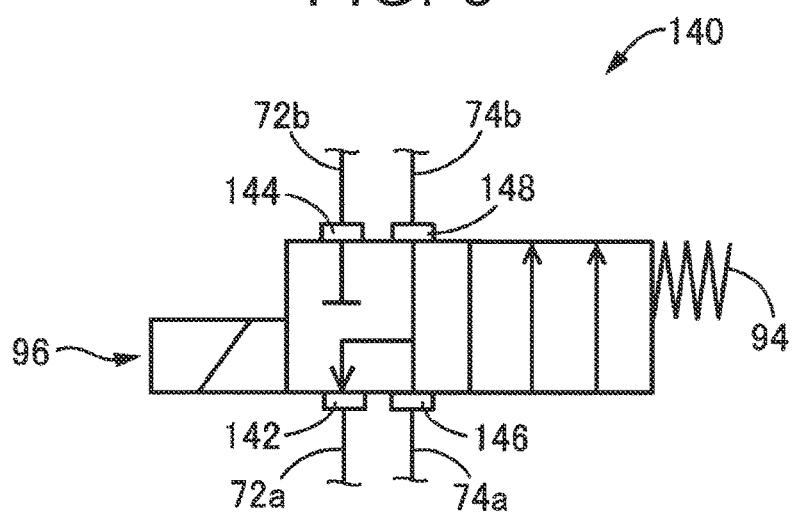
FIG. 8 is a diagram that shows the structure of a change-over valve for achieving Mode 6 of FIG. 6.

When the change-over valve 78 is replaced with a change-over valve 140 shown in FIG. 8 in the lubrication and cooling system 70 of FIG. 2, Mode 6 in FIG. 6 is implemented. FIG. 8 shows a state where the change-over valve 140 is switched into a second state, that is, a state during reverse travel. As shown in FIG. 8, the change-over valve 140 is configured, during reverse travel, such that a first port 142 connected to the first input oil passage 72a, a third port 146 connected to the second input oil passage 74a, and a fourth port 148 connected to the second output oil passage 74b are communicated while a second port 144 connected to the first output oil passage 72b is interrupted.

When the status of communication of the change-over valve 140 is changed as described above, oil discharged from the engine-driven pump P2 is supplied to the discharge port 82b of the differential gear-driven pump P1 through the second input oil passage 74a, the change-over valve 140, and the first input oil passage 72a and is also supplied to the first electric motor MG1, the second electric motor MG2, and the gears and bearings of the planetary gear train 24 through the second output oil passage 74b during reverse travel. Therefore, the differential gear-driven pump P1 operates as a hydraulic motor, so a power generated in the differential gear-driven pump P1 to act in the reverse travel direction can be transmitted to the drive wheels 14, the first electric motor MG1 and the second electric motor MG2 can be cooled, and the gears and bearings of the planetary gear train 24 can be lubricated.

Figure 9:
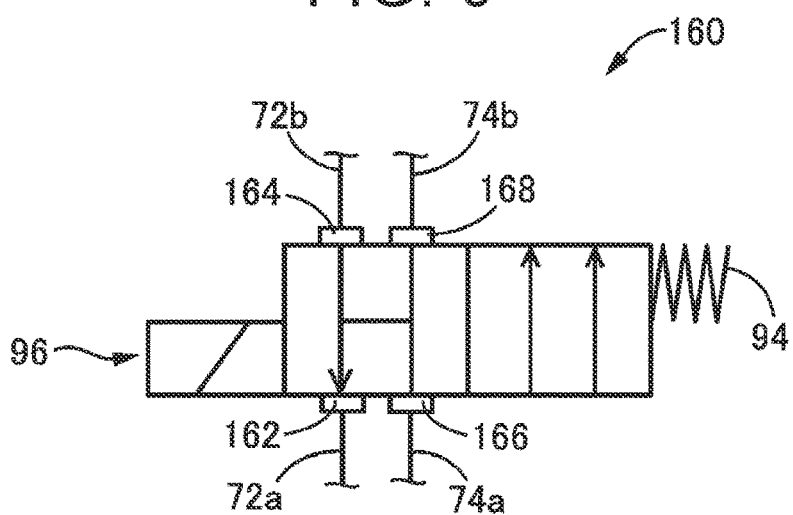
FIG. 9 is a diagram that shows the structure of a change-over valve for achieving Mode 8 of FIG. 6.

When the change-over valve 78 is replaced with a change-over valve 160 shown in FIG. 9 in the lubrication and cooling system 70 of FIG. 2, Mode 8 in FIG. 6 is implemented. FIG. 9 shows a state where the change-over valve 160 is switched into a second state, that is, a state during reverse travel. As shown in FIG. 9, the change-over valve 160 is configured, during reverse travel, such that a first port 162 connected to the first input oil passage 72a, a second port 164 connected to the first output oil passage 72b, a third port 166 connected to the second input oil passage 74a, and a fourth port 168 connected to the second output oil passage 74b are communicated.

When the status of communication of the change-over valve 160 is switched as described above, oil discharged from the engine-driven pump P2 is supplied to the discharge port 82b of the differential gear-driven pump P1 through the second input oil passage 74a, the change-over valve 160, and the first input oil passage 72a during reverse travel. In addition, oil discharged from the engine-driven pump P2 is supplied to the first output oil passage 72b and the second output oil passage 74b through the change-over valve 160, so oil is supplied to the gears in the gear chamber 58, the bearings in the gear chamber 58, the first electric motor MG1, the second electric motor MG2, and the gears and bearings of the planetary gear train 24.

Figure 10:
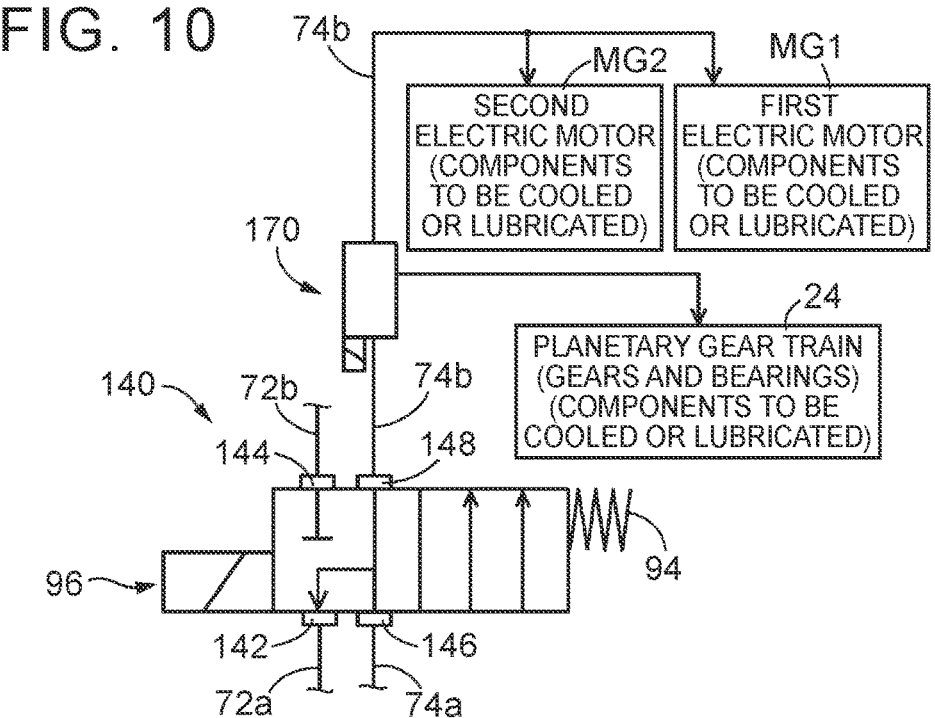
FIG. 10 is a diagram that shows the structure of a lubrication and cooling system for achieving Mode 3 and Mode 4 of FIG. 6.

As shown in FIG. 10, when the change-over valve 78 is replaced with the change-over valve 140 shown in FIG. 8 in the lubrication and cooling system 70 of FIG. 2 and an oil supply destination change-over valve 170 configured to switch the destination to be supplied with oil to one of a set of the first electric motor MG1 and the second electric motor MG2 and a set of the gears and bearings of the planetary gear train 24 is added to the second output oil passage 74b, Mode 3 and Mode 4 shown in FIG. 6 are implemented. Although not shown in the drawing, when the change-over valve 78 is replaced with the change-over valve 160 shown in FIG. 9 in the lubrication and cooling system 70 of FIG. 2 and the above-described oil supply destination change-over valve 170 is added to the second output oil passage 74b, Mode 5 and Mode 7 shown in FIG. 6 are implemented.

As described above, even when part of oil discharged from the discharge port 84b of the engine-driven pump P2 is supplied to the components to be cooled or lubricated during reverse travel, the remaining part of oil discharged from the discharge port 84b of the engine-driven pump P2 is supplied to the discharge port 82b of the differential gear-driven pump P1. Therefore, similar advantageous effects to those of the above-described first and second embodiments are obtained.

Figure 11:
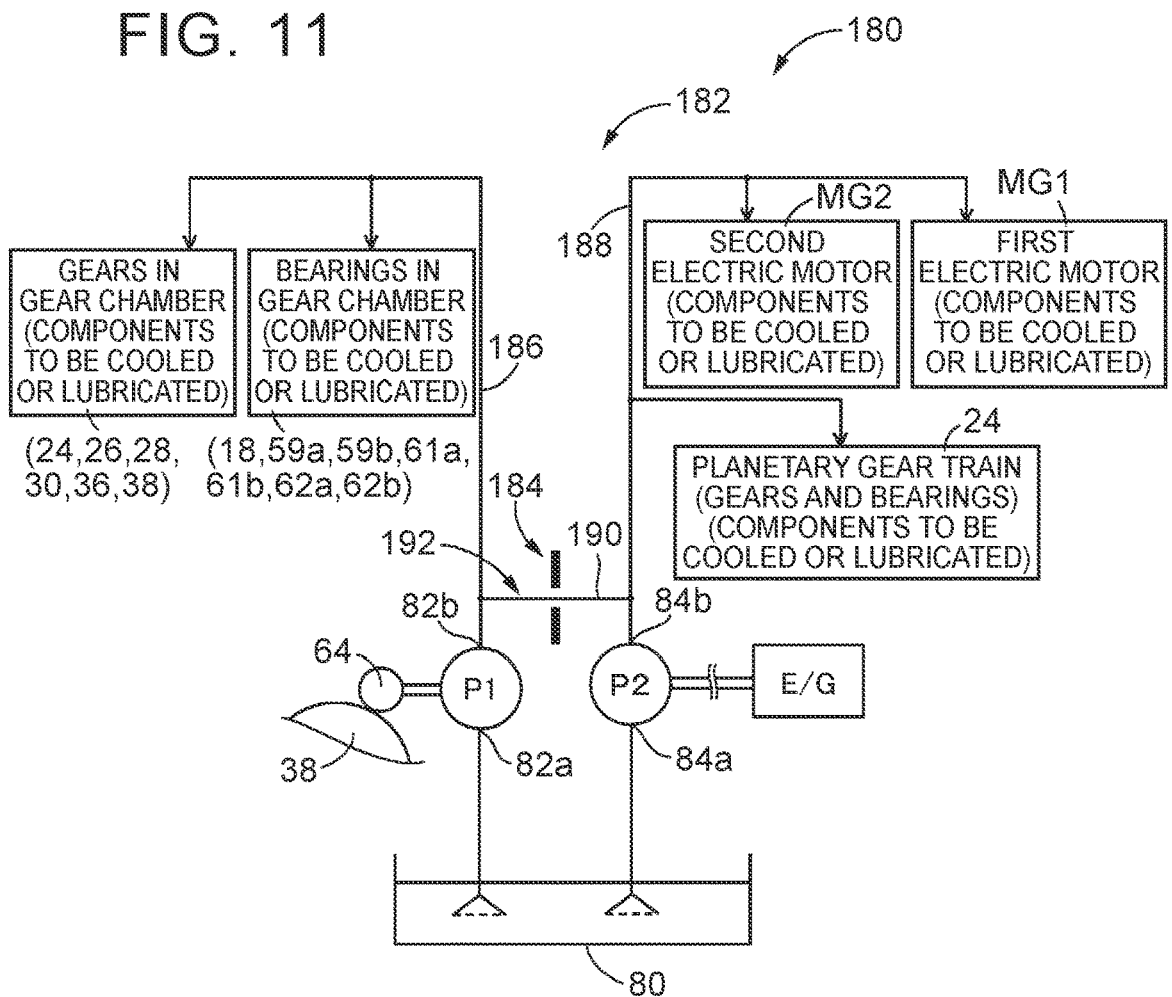
FIG. 11 is a schematic diagram of a lubrication and cooling system provided in a hybrid vehicle according to a fourth embodiment of the disclosure.

FIG. 11 is a schematic diagram of a lubrication and cooling system 182 provided in a hybrid vehicle 180 according to a fourth embodiment of the disclosure. When the lubrication and cooling system 182 of FIG. 11 is compared with the lubrication and cooling system 70 of the above-described first embodiment, the change-over valve 78 is replaced with an orifice 184. The other structure is the same as that of the lubrication and cooling system 70 of the above-described first embodiment, so the description thereof is omitted.

As shown in FIG. 11, oil discharged from the discharge port 82b of the differential gear-driven pump P1 is supplied to the gears in the gear chamber 58 and the bearings in the gear chamber 58 through a first oil passage 186. In addition, oil discharged from the discharge port 84b of the engine-driven pump P2 is supplied to the first electric motor MG1, the second electric motor MG2, and the gears and bearings of the planetary gear train 24 through a second oil passage 188.

A coupling oil passage 190 that connects the first oil passage 186 and the second oil passage 188 is provided, and the orifice 184 is provided in the coupling oil passage 190. Therefore, part of oil discharged from the discharge port 84b of the engine-driven pump P2 can be supplied to the discharge port 82b of the differential gear-driven pump P1 through the coupling oil passage 190. Thus, part of the first oil passage 186, the coupling oil passage 190, and part of the second oil passage 188 make up an oil passage 192 that supplies oil discharged from the discharge port 84b of the engine-driven pump P2 to the discharge port 82b of the differential gear-driven pump P1. The oil passage 192 includes the orifice 184.

With the above configuration, when the engine-driven pump P2 is driven and oil discharged from the discharge port 84b of the engine-driven pump P2 is supplied to the discharge port 82b of the differential gear-driven pump P1 during reverse drive, a power that acts in the reverse travel direction can be applied to the drive wheels 14 by operating the differential gear-driven pump P1 as a hydraulic motor. When the opening degree of the orifice 184 is adjusted, the amount of oil that is supplied to the differential gear-driven pump P1 can be adjusted, so a power that is transmitted to the drive wheels 14 via the differential gear-driven pump P1 can be appropriately adjusted. The structure is simpler than that of the case where the change-over valve 78 is provided as in the case of the lubrication and cooling system 70 of the above-described first embodiment, so mountability is also high.

As described above, even when the orifice 184 is used instead of the change-over valve 78 shown in FIG. 3 of the above-described first embodiment, the differential gear-driven pump P1 can be operated as a hydraulic motor, so similar advantageous effects to those of the above-described first to third embodiments are obtained.

Figure 12:
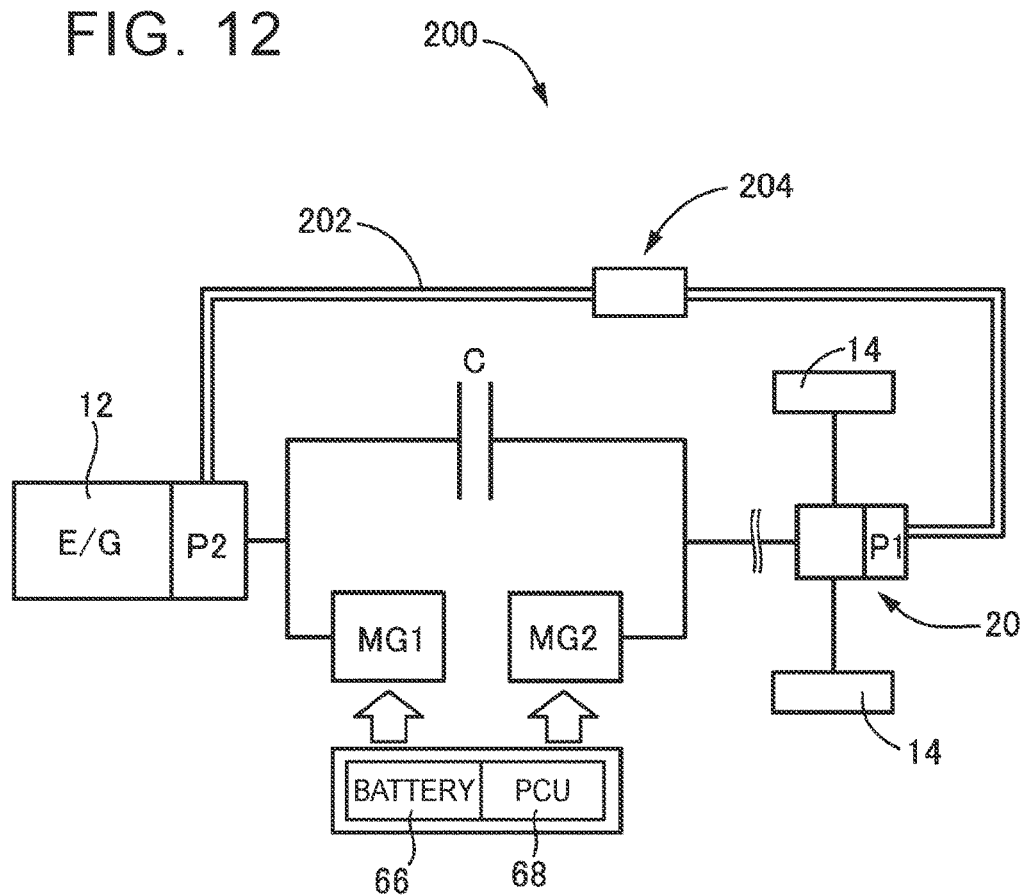
FIG. 12 is a diagram that shows the schematic configuration of a hybrid vehicle according to a fifth embodiment of the disclosure.

FIG. 12 is the schematic configuration of a hybrid vehicle 200 (hereinafter, referred to as vehicle 200) according to a fifth embodiment of the disclosure. The vehicle 200 includes the engine 12 that serves as a driving force source, the first electric motor MG1 connected to the engine 12 such that power is transmittable, the second electric motor MG2 that serves as a driving force source, and a clutch C inserted between the engine 12 and the differential gear set 20. The vehicle 200 includes the differential gear-driven pump P1 and the engine-driven pump P2. The differential gear-driven pump P1 is driven by the differential ring gear 38 (see FIG. 1, or the like) of the differential gear set 20. The engine-driven pump P2 is driven by the engine 12.

The vehicle 200 is configured to be able to shift into the hybrid drive mode (HV mode) and the motor drive mode (EV mode). In the hybrid drive mode (HV mode), the vehicle 200 travels by using the engine 12 and the second electric motor MG2. In the motor drive mode (EV mode), the vehicle 200 travels by using a power that is output from the second electric motor MG2. For example, when the clutch C is engaged, the engine 12 is connected to the drive wheels 14 via the clutch C such that power is transmittable, so the vehicle 200 is able to travel in the HV mode by using the engine 12 and the second electric motor MG2. Therefore, during forward travel in the HV mode, the engine 12 and the second electric motor MG2 are used as the driving force sources. When the clutch C is released, connection of the engine 12 and the drive wheels 14 is interrupted, so the vehicle 200 travels in the EV mode by using the second electric motor MG2. Therefore, during forward travel in the EV mode, the second electric motor MG2 is used as the driving force source.

During reverse travel, the clutch C is released, and a power that acts in the reverse travel direction is output from the second electric motor MG2. In other words, during reverse travel, only the second electric motor MG2 is used as the driving force source. In this way, the vehicle 200 travels by using only the power of the second electric motor MG2 during reverse travel, so there are concerns about shortage of driving force.

In this regard, in the fifth embodiment as well, an oil passage 202 that is able to supply oil discharged from a discharge port of the engine-driven pump P2 to a discharge port of the differential gear-driven pump P1 during reverse travel is provided. The oil passage 202 is configured to be communicated or interrupted by a change-over valve 204 provided in the oil passage 202.

In the thus configured vehicle 200, during reverse travel, a power that is output from the second electric motor MG2 to act in the reverse travel direction is transmitted to the drive wheels 14 in a state where the clutch C is released. The engine-driven pump P2 is driven by the engine 12 or the first electric motor MG1. Oil discharged from the discharge port of the engine-driven pump P2 is supplied to the discharge port of the differential gear-driven pump P1 through the oil passage 202. As a result, the differential gear-driven pump P1 is rotated in the reverse direction, and the differential gear-driven pump P1 is operated as a hydraulic motor. Thus, a power generated in the differential gear-driven pump P1 is applied to the drive wheels 14 via the differential gear set 20, so shortage of driving force during reverse travel is resolved.

As described above, even with the vehicle 200 of the fifth embodiment, a power generated in the differential gear-driven pump P1 is transmitted to the drive wheels 14 via the differential gear set 20 during reverse travel, so similar advantageous effects to those of the above-described first to fourth embodiments are obtained.

Figure 13:
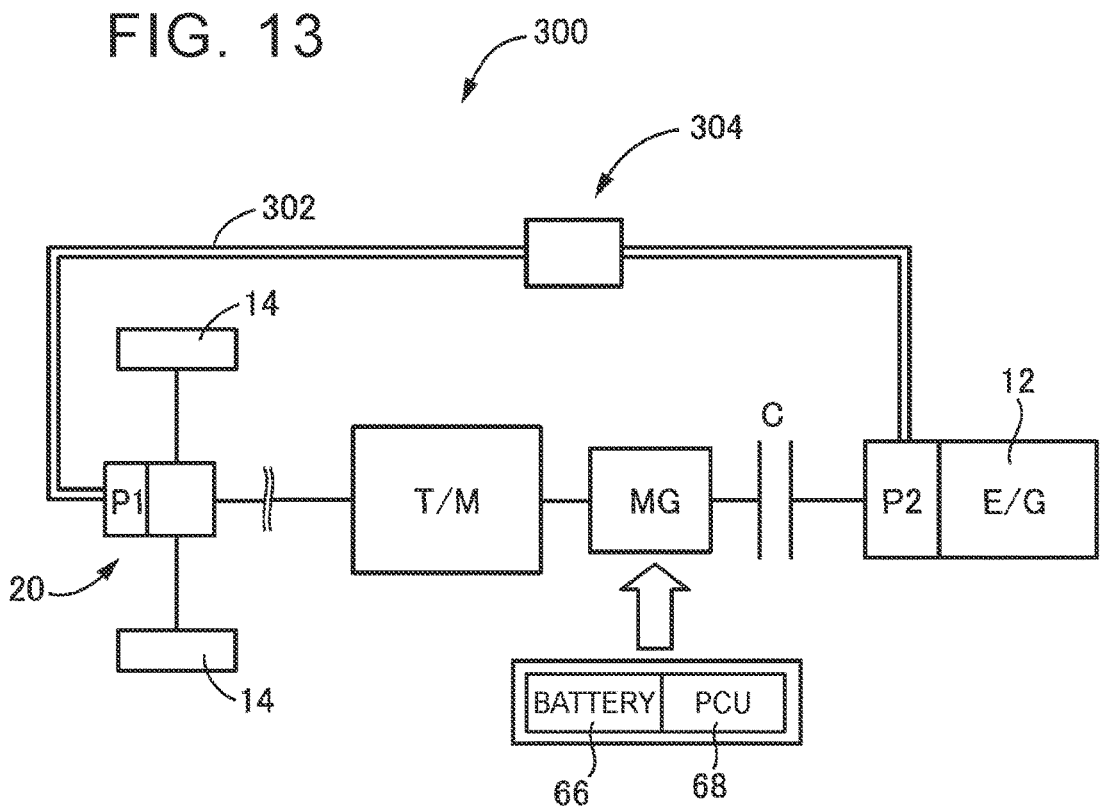
FIG. 13 is a diagram that shows the schematic configuration of a hybrid vehicle according to a sixth embodiment of the disclosure.

FIG. 13 shows the schematic configuration of a hybrid vehicle 300 (hereinafter, referred to as vehicle 300) according to a sixth embodiment of the disclosure. The vehicle 300 includes the engine 12 that serves as a driving force source, an electric motor MG that serves as a driving force source, the clutch C inserted between the engine 12 and the electric motor MG, and a transmission T/M provided in a power transmission path between the electric motor MG and the drive wheels 14. The vehicle 300 includes the differential gear-driven pump P1 and the engine-driven pump P2. The differential gear-driven pump P1 is driven by the differential ring gear 38 (see FIG. 1, or the like) of the differential gear set 20. The engine-driven pump P2 is driven by the engine 12.

The vehicle 300 is configured to be able to shift into the hybrid drive mode (HV mode) and the motor drive mode (EV mode). In the hybrid drive mode (HV mode), the vehicle 300 travels by using the engine 12 and the electric motor MG. In the motor drive mode (EV mode), the vehicle 300 travels by using a power that is output from the electric motor MG. For example, when the clutch C is engaged, the engine 12 is connected to the drive wheels 14 via the clutch C, the electric motor MG, the transmission T/M, and other components, such that power is transmittable, so the vehicle 300 is able to travel in the HV mode by using the engine 12 and the electric motor MG. Therefore, during forward travel in the HV mode, the engine 12 and the electric motor MG are used as the driving force sources. When the clutch C is released, connection of the engine 12 and the drive wheels 14 is interrupted, so the vehicle 300 travels in the EV mode by using the electric motor MG. Therefore, during forward travel in the EV mode, the electric motor MG is used as the driving force source.

During reverse travel, the clutch C is released, a power that acts in the reverse travel direction is output from the electric motor MG, and the power is transmitted to the drive wheels 14 via the transmission T/M, the differential gear set 20, and other components. In other words, during reverse travel, only the electric motor MG is used as the driving force source. In this way, the vehicle 300 travels by using only the power of the electric motor MG during reverse travel, so there are concerns about shortage of driving force.

In this regard, in the sixth embodiment as well, an oil passage 302 that is able to supply oil discharged from a discharge port of the engine-driven pump P2 to a discharge port of the differential gear-driven pump P1 during reverse travel is provided. The oil passage 302 is configured to be communicated or interrupted by a change-over valve 304 provided in the oil passage 302.

In the thus configured vehicle 300, during reverse travel, a power that is output from the electric motor MG is transmitted to the drive wheels 14 via the transmission T/M in a state where the clutch C is released. The engine-driven pump P2 is driven by the engine 12. Oil discharged from the discharge port of the engine-driven pump P2 is supplied to the discharge port of the differential gear-driven pump P1 through the oil passage 302. As a result, the differential gear-driven pump P1 is rotated in the reverse direction, and the differential gear-driven pump P1 is operated as a hydraulic motor. Thus, a power generated in the differential gear-driven pump P1 is applied to the drive wheels 14 via the differential gear set 20, so shortage of driving force during reverse travel is resolved.

As described above, even with the vehicle 300 of the sixth embodiment, a power generated in the differential gear-driven pump P1 is transmitted to the drive wheels 14 via the differential gear set 20 during reverse travel, so similar advantageous effects to those of the above-described first to fifth embodiments are obtained.

The embodiments of the disclosure are described in detail with reference the drawings; however, the disclosure is also applicable to other embodiments.

For example, the above-described embodiments are not necessarily implemented solely and may be implemented in combination as needed. For example, the electric oil pump EOP may be used instead of the engine-driven pump P2 of the lubrication and cooling system 182 of the above-described fourth embodiment. In the above-described third embodiment, each of Mode 1 to Mode 8 shown in FIG. 6 includes the engine-driven pump P2 that is driven by the engine 12. Alternatively, the electric oil pump EOP may be used instead of the engine-driven pump P2.

In the above-described fifth embodiment, the vehicle 200 includes the engine-driven pump P2 that is driven by the engine 12 or the first electric motor MG1. Alternatively, the electric oil pump EOP may be used instead of the engine-driven pump P2. In the vehicle 200, an orifice may be provided instead of the change-over valve 204 provided in the oil passage 202 that connects the discharge port of the differential gear-driven pump P1 and the discharge port of the engine-driven pump P2.

In the above-described sixth embodiment, the vehicle 300 includes the engine-driven pump P2 that is driven by the engine 12. Alternatively, the electric oil pump EOP may be used instead of the engine-driven pump P2. In the vehicle 300, an orifice may be provided instead of the change-over valve 304 provided in the oil passage 302 that connects the discharge port of the differential gear-driven pump P1 and the discharge port of the engine-driven pump P2.

In the above-described embodiments, the differential gear-driven pump P1 is coupled to the differential ring gear 38 of the differential gear set 20 such that power is transmittable; however, the disclosure is not necessarily limited to the configuration that the differential gear-driven pump P1 is coupled to the differential ring gear 38. For example, the differential gear-driven pump P1 may be driven by the counter gear 28 provided on the counter shaft 32. In short, a rotating member that rotates with the rotation of the drive wheels 14, that is, a rotating member that is mechanically coupled to the drive wheels 14, can be employed as the one that drives the differential gear-driven pump P1 as needed.

In the above-described embodiments, the engine-driven pump P2 is connected to the engine 12 via the input shaft 23 such that power is transmittable; however, the engine-driven pump P2 is not necessarily limited to this configuration. For example, the engine-driven pump P2 may be directly driven by the crankshaft of the engine 12. In short, the engine-driven pump P2 may be modified as needed as long as the engine-driven pump P2 is driven via a rotating member that is mechanically coupled to the engine 12.

In the above-described embodiments, oil is supplied to the gears in the gear chamber 58, the bearings in the gear chamber 58, the first electric motor MG1, the second electric motor MG2, and the gears and bearings of the planetary gear train 24 as the components to be cooled or lubricated; however, the components to be cooled or lubricated are not necessarily limited to these components. In short, as long as components are required to be lubricated or cooled during travel, components to be cooled or lubricated can be modified as needed according to the structure of a vehicle.

The above-described embodiments are only illustrative. The disclosure may be implemented in modes including various modifications or improvements based on the knowledge of persons skilled in the art.

What is claimed is:

1. A hybrid vehicle comprising:
an engine configured as a driving force source;
   a drive motor configured as a driving force source;
   a first oil pump configured to be mechanically driven by a driving force that is transmitted via an output part from at least one of the engines or the drive motor; and
   a second oil pump configured to be driven by a driving force from a rotational driving source, the driving force being different from a driving force that is transmitted to the output part, wherein
during forward travel of the hybrid vehicle, the hybrid vehicle travels by using at least one of the engine or the drive motor,
during reverse travel of the hybrid vehicle, the hybrid vehicle uses the drive motor and travels by transmitting a driving force from the drive motor to a drive wheel via the output part, and during forward travel of the hybrid vehicle, the hybrid vehicle is configured to supply components to be cooled or lubricated with oil discharged from a discharge port of the first oil pump and a discharge port of the second oil pump via an oil passage, while during reverse travel of the hybrid vehicle, the hybrid vehicle is configured to cause the first oil pump to operate as a hydraulic motor by supplying oil discharged from the discharge port of the second oil pump to the discharge port of the first oil pump via the oil passage.

2. The hybrid vehicle according to claim 1, wherein:

the oil passage includes a change-over valve; and the change-over valve is configured to, during forward travel, switch into a first state where oil discharged from the discharge port of the first oil pump and the discharge port of the second oil pump is supplied to the components to be cooled or lubricated via the oil passage, while the change-over valve is configured to, during reverse travel, switch into a second state where oil discharged from the discharge port of the second oil pump is supplied to the discharge port of the first oil pump via the oil passage.

3. The hybrid vehicle according to claim 2, wherein the change-over valve is configured to switch whether to supply oil to at least part of the components to be cooled or lubricated.

4. The hybrid vehicle according to claim 1, wherein the oil passage includes an orifice.

5. The hybrid vehicle according to claim 1, wherein the rotational driving source is the engine.

6. The hybrid vehicle according to claim 5, further comprising a power distribution mechanism configured to distribute a power of the engine between a differential motor and the output part, wherein, during reverse travel, the engine of the hybrid vehicle is rotated by a power of the differential motor via the power distribution mechanism.

7. The hybrid vehicle according to claim 1, wherein the rotational driving source is an electric motor.

* * * * *